US012771746B2

(12) United States Patent
Hamann et al.

(10) Patent No.: US 12,771,746 B2
(45) Date of Patent: Oct. 20, 2026

(54) METHOD FOR PROVIDING AN ITEM OF TIME INFORMATION

(71) Applicant: Robert Bosch GmbH, Stuttgart (DE)

(72) Inventors: Arne Hamann, Ludwigsburg (DE); Dakshina Narahari Dasari, Boeblingen (DE); Dirk Ziegenbein, Freiberg am Neckar (DE); Michael Pressler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 18/299,232

(22) Filed: Apr. 12, 2023

(65) Prior Publication Data

US 2023/0370523 A1 Nov. 16, 2023

(30) Foreign Application Priority Data

May 13, 2022 (DE) ..................... 10 2022 204 719.2

(51) Int. Cl.

| | |
|---|---|
| ***H04L 67/12*** | (2022.01) |
| ***B60W 50/06*** | (2006.01) |
| ***H04L 43/0864*** | (2022.01) |

(52) U.S. Cl.

CPC ............ *H04L 67/12* (2013.01); *B60W 50/06* (2013.01); *H04L 43/0864* (2013.01); *B60W 2556/45* (2020.02)

(58) Field of Classification Search

CPC .......... B60K 28/00–165; B60W 30/12; B60W 30/16; B60W 30/162; B60W 30/165; B60W 30/17; B60W 30/182; B60W 50/082; B60W 50/06; B60W 2556/45; G05D 1/0061; G05D 1/0088; G05D 1/021; G05D 1/0214;

(Continued)

(56) References Cited

U.S. PATENT DOCUMENTS 6,993,246 B1 * 1/2006 Pan ........................ H04L 67/12 386/239

7,853,377 B2 * 12/2010 Fuhrman ............... G06F 9/4881 370/335

(Continued)

OTHER PUBLICATIONS

Jochen Seemann et al., Safety Mechanisms Using the DDS middleware in Software-Defined Cars, Nov. 8, 2021, nxp.cp, pp. 1-7 (pdf).*

(Continued)

*Primary Examiner* — Manglesh M Patel
(74) *Attorney, Agent, or Firm* — Norton Rose Fulbright US LLP

(57) ABSTRACT

A method for providing an item of time information related to a piece of communication content in a distributed system of at least one application. The method includes: providing the time information about a time of a generation of the communication content, providing the communication content for the purpose of a chained processing of the communication content, comprising at least one interim processing operation and a target processing operation by different processing blocks of the at least one application, wherein the time information is provided for at least one of the different processing blocks in order to evaluate the time information at least during the target processing operation for the purpose of assessing the processed communication content.

14 Claims, 3 Drawing Sheets

(58) Field of Classification Search
CPC .... G05D 1/0221; G05D 1/0223; H04L 67/12; H04L 43/0864; H04L 1/0018
USPC .......................................................... 701/24
See application file for complete search history.

(56) References Cited

U.S. PATENT DOCUMENTS

| | | | | |
|---|---|---|---|---|
| 8,150,988 | B2 * | 4/2012 | Pardo-Castellote | H04L 9/40 709/224 |
| 8,380,383 | B2 * | 2/2013 | Preston | H04L 41/22 701/24 |
| 8,671,135 | B1 * | 3/2014 | Joshi | H04L 41/0893 455/410 |
| 8,874,686 | B2 * | 10/2014 | Jun | G06F 9/545 709/217 |
| 9,015,672 | B2 * | 4/2015 | Dause | G06F 11/3698 717/124 |
| 10,749,942 | B2 * | 8/2020 | Nakaaki | G06F 13/14 |
| 10,871,994 | B2 * | 12/2020 | Nasu | G06F 17/18 |
| 2002/0129137 | A1 * | 9/2002 | Mills, III | H04L 67/02 709/224 |
| 2002/0188659 | A1 * | 12/2002 | Ohashi | H04L 67/12 709/224 |
| 2014/0165064 | A1 * | 6/2014 | Takeda | G06F 11/3006 718/100 |
| 2020/0272569 | A1 * | 8/2020 | Park | G06F 12/0868 |
| 2022/0297635 | A1 * | 9/2022 | Fang | B60R 25/24 |
| 2024/0036931 | A1 * | 2/2024 | Rodriguez | G06F 9/5077 |

OTHER PUBLICATIONS

Boyang Song et al., Integration of Data Distribution Service into Partitioned Real-time Embedded Systems, 2020, IEEE, pp. 1606-1611.*

Punit Galav et al., Data Usage Monitoring Method Using Metadata in Vehicle Data Distribution, 2022, IEEE, pp. 622-626.*

Dongxiao Yu et al., Distributed Scheduling Algorithm for Optimizing Age of Information In Wireless Networks, 2020, IEEE, pp. 1-8 (pdf).*

Data Distribution Service, DDS Foundation, Downloaded Apr. 12, 2023, pp. 1-6. <https://www.dds-foundation.org/>.

* cited by examiner

METHOD FOR PROVIDING AN ITEM OF TIME INFORMATION

CROSS REFERENCE

The present application claims the benefit under 35 U.S.C. § 119 of German Patent Application No. DE 10 2022 204 719.2 filed on May 13, 2022, which is expressly incorporated herein by reference in its entirety.

FIELD

The present invention relates to a method for providing an item of time information related to a piece of communication content in a distributed system of at least one application. In addition, the present invention relates to a computer program and to a distributed system for this purpose.

BACKGROUND INFORMATION

Conventional middleware solutions that provide communication content for applications and take account of QoS (Quality of Service) guidelines for real-time requirements, e.g., maximum latencies, are described in the related art. For instance, the Data Distribution Service (DDS; see https://www.dds-foundation.org/) allows for the declarative specification of a 'deadline,' which indicates a maximum period of time within which it can be assumed that exchanged communication content (also referred to as topics) has been updated. Similarly, DDS makes it possible to specify a 'latency budget,' which specifies to the middleware how much time is available for delivering data.

However, conventional middleware solutions only implement these QoS guidelines to a limited extent, for example from a time at which a message arrives from a source node up to the time at which the message is relayed to a target node for processing. Consequently, conventional middleware solutions can only take account of the times at which a data packet is transferred to them and the time at which they deliver said data packet to the target again (i.e., 'end to end'). However, the middleware does not know all the message and/or data properties.

In addition, operating systems such as QNX or Linux offer reservation-based scheduling mechanisms (e.g., adaptive partitioning for QNX or SCHED_DEADLINE for Linux), which allow time properties, such as response times, of executed functionalities to be monitored. However, these are based on individual computing nodes, and the provided mechanisms alone are not suitable for distributed functions in a distributed environment. Therefore, standalone solutions for monitoring time requirements are available for communication and computing resources in the related art. However, there is a need for solutions that can adequately handle end-to-end time requirements in a distributed system. Adequate observation of the requirements regarding end-to-end latency times may be necessary in order to ensure correct functional behavior and sufficient performance.

SUMMARY

The present invention relates to a method, a computer program, and a distributed system. Further features and details of the present invention become apparent from the disclosure herein. In this respect, it goes without saying that features and details described in connection with the method according to the present invention are also described in connection with the computer program according to the present invention and the distributed system according to the present invention, and vice versa, so reference always is or can be made reciprocally to the disclosure in relation to the individual aspects of the present invention.

In the method according to an example embodiment of present invention, it is provided in particular that the following providing steps are performed, preferably in an automated manner and/or successively in the stated order, preferably by a piece of middleware:

- providing the time information about a time of a generation of the communication content, in particular of a once-only generation of the communication content, for example through a capture by a sensor and/or a measurement and/or an input and/or the like,
- providing the communication content for the purpose of a chained processing of the communication content, in particular a function chain, comprising at least one interim processing operation and a target processing operation by different processing blocks of the at least one application, i.e., for example of a single application or a plurality of applications.

The function chain can thus be provided by the processing blocks. However, the processing blocks can be executed independently of one another, for example as processes of one or more applications or each as part of a distinct application. It is therefore also possible for the processing blocks to each be part of a distinct application such that the function chain can be formed by a plurality of applications executed independently of one another. The execution of the applications independently of one another can be based on the fact that the processing blocks are each executed by distinct computing nodes in parallel and/or in a hardware-independent manner. In some cases, it may also be provided that processing blocks do not have distinct computing nodes but rather are executed together on one computing node. However, it is advantageous to execute each processing block solely on a distinct computing node or using a distinct application. Particularly when the computing nodes of the system are configured heterogeneously, having different performances and resources, the function chain can thus be distributed more efficiently.

It is also possible for the time information to be provided for at least one or a plurality or all of the different processing blocks, preferably by the middleware, in order to evaluate the time information at least during the target processing operation, or also during the interim processing operation, for the purpose of assessing the processed communication content. The advantage of this is that a latency not only of individual processing blocks but over the entire chained processing operation can be reliably ascertained.

In addition, the processing blocks can be provided by different computing resources of the system having different performances and/or can use different communication resources of the system for providing the communication content. The method can thus have the advantage whereby end-to-end time requirements at application level can be handled better across all the computing and communication resources.

The processed communication content may be the communication content processed in each case by the interim and/or target processing operation, in which case it thus differs from the originally generated communication content but is based thereon. This is the case, for example, when the generated communication content includes an image related to the surroundings of a vehicle and the processed communication content includes a list of objects that have been detected in the image. The communication content can optionally also be executed as a topic. In the following, a 'topic' refers to a payload, i.e., data that are cohesive in terms of content or function. For the purpose of the chained processing operation, the topic may then be exchanged preferably between two processing blocks, e.g., independent applications or processes or software parts.

According to an example embodiment of the present invention, it is also advantageous if the providing steps are executed by a piece of middleware. Preferably, the middleware can provide communication between the processing blocks in order to provide the time information during the chained processing operation in a manner assigned to the communication content. A piece of middleware, which can optionally also be referred to as brokering software, is in particular an application-neutral program that switches between the processing blocks in order to be able to reduce the complexity and infrastructure. Mechanisms and a corresponding API (application programming interface) may be provided in order to enhance the middleware. In this context, a special feature may be the possibility of appending at least one or a plurality of QoS properties to communicated topics and examining said properties. By way of example, a QoS property of this kind can be provided by the time information.

In addition, in the context of the present invention it is possible that the time information is provided by the time information being assigned to the communication content, in particular by the middleware. In this respect, the time information may include an item of latency information about the time of the generation, preferably up to a target processing of the processed communication content. In addition, the assigned time information can be retrieved during the target processing operation, preferably using the middleware, for the purpose of the evaluation. By way of example, this allows a response time of the application and/or a data age of the communication content to be evaluated during the assessment, for example. As a result of this, appropriate action which, for example, influences the activation of an actuator may potentially be taken for the target processing operation.

According to an example embodiment of the present invention, it may be advantageous if, in the context of the present invention, the middleware is configured to register a real-time requirement in order to detect a breach of the real-time requirement on the basis of the time information, in particular automatically. In this respect, the real-time requirement can preferably define a maximum duration of a latency, preferably end-to-end latency, of the application. The latency (or end-to-end latency) can refer to the entire duration of the chained processing operation. Therefore, the assessment of the processed communication content can be construed as an end-to-end time analysis of the chained processing operation. The latency (or end-to-end latency) can also be based on the time period between the occurrence of a cause (such as the generation, i.e., for example external activity or sampling of a sensor value) and of a discernible effect (such as a termination of the processing or an activation, e.g., movement of an actuator) of said function chain. The end-to-end time analysis can thus serve in particular to ensure proper behavior in distributed cyber-physical systems or control applications having real-time requirements.

By way of example, the assessment of the processed communication content may comprise the following step:

comparing the time of the generation with a current time and with the real-time requirement in order to detect a breach of the real-time requirement.

The current time can, for example, be ascertained by a timer of a computing node. The real-time requirement can thus be reliably monitored in order to avoid problematic situations during the processing, for example as regards an activation of an actuator.

In addition, according to an example embodiment of the present invention, the middleware may be configured to register a callback in the middleware in order to execute the callback as soon as the breach of the real-time requirement is detected. In other words, a callback that is executed when the breach is detected can be registered in the middleware. Thus, a quick, programmatic response to the breach of the real-time requirement is possible. By way of example, this may involve rejecting the corresponding communication content.

Advantageously, in the context of the present invention it may be provided that the system is configured as a cyber-physical system in which an actuator is activated depending on the target processing operation, wherein the callback can be executed so as to stop the activation of the actuator and/or to change said activation, in particular to run the actuator in a slowed-down manner. A cyber-physical system can denote a grouping of IT and software components having mechanical and electronic parts that can preferably communicate via a data infrastructure, for example the internet. The above-described components and parts can together be referred to as the processing blocks.

It is also possible for the time information to be provided for a plurality or all of the different processing blocks, in particular in order to evaluate the time information during the at least one interim processing operation and during the target processing operation for the purpose of assessing the processed communication content. The assessment can, for example, be an assessment of the latency with which the processed communication content is available. Real-time requirements such as the latency in the chained processing operation can thus be monitored more comprehensively.

Advantageously, in an example embodiment of the present invention it may be provided that the at least one application and/or the processing blocks are each allocated a real-time requirement or different real-time requirements, wherein the real-time requirement or the different real-time requirements comprise(s) at least one of the following requirements, in particular QoS requirements:

- a maximum execution time of the application and/or of the at least one interim processing operation and/or of the target processing operation,
- a maximum response time of the application,
- a maximum data age of the processed communication content,
  - wherein the data age is preferably derived from the time information about the time of the generation of the communication content and a current time during the chained processing operation, wherein the provided time information is preferably evaluated at least during the target processing operation in order to assess compliance with the at least one requirement.

On the basis of the provided time information, for example a data age can be calculated, i.e., in particular the length of time that has passed since the communication content was generated. This QoS property can be used, for example, to establish on the receiver side, i.e., in particular during the target processing operation or when activating the actuator, for how long the data may be used for functional calculations. In addition, on the basis of the provided time information, a response time can also be calculated, i.e., in particular the length of time that passes until the communication content can reach a receiver such as the target processing operation or the actuator, and be used for the first time. Said QoS property may be used, for example, to set requirements regarding the response capabilities of a functionality. On the basis of the QoS properties, it is also possible to prioritize different pieces of available communication content for the processing operations and/or to communicate and/or relay it to one of the processing blocks.

The expression 'maximum response time' may denote a duration of the longest time period from the occurrence of an external cause up to the time at which said external cause has been processed in full. The external cause is, for example, the generation of the communication content, for example by a sensor, and full processing occurs, for example, once the target processing operation is complete. In more general terms, the maximum response time can answer the question of what the maximum amount of time is from the time at which the communication content is generated until the chained processing operation is complete.

The expression 'maximum data age' refers in particular to a duration of the longest time period from a value being sampled up to the last time at which an actuation is carried out on the basis of that sampled value. By way of example, the value is sampled while the communication content is being generated, in particular by a sensor, and the actuation is, for example, an activation of an actuator. In more general terms, the maximum data age answers the question of the age of the data that are used as the basis for an actuation.

Preferably, in the context of the present invention it may be provided that the different processing blocks are each executed as different processes of the at least one application or as different parts of the at least one application or as different applications or parts thereof, and preferably are executed by different, heterogeneous computing nodes of a network. A distributed structure can thus be provided in order to be able to flexibly use resources of the system for the processing. In this case, the processing blocks, in particular the processes, can change the processing operations, such as the target and/or interim processing operations, by, for example, causing the processes to process, i.e., evaluate and/or change, the content of the communication content.

In the context of the present invention, it may also be advantageous for a plurality of interim processing operations to be provided as the at least one interim processing operation, i.e., for not just one but a plurality of interim processing operations to be provided. In addition, the communication content can be provided by initially providing the generated communication content for the chained processing operation for the interim processing operations by way of a communication, and by providing a result of the interim processing operations as the processed communication content for the target processing operation. In this case, the communication can be provided by the middleware, in particular messaging middleware, between the processing blocks at application level, wherein the time information is likewise provided at said application level. Therefore, so-called messaging middleware systems, for example Publish-Subscribe protocols such as DDS or MQTT, can preferably be used for the communication between the processing blocks of the application. On the basis of the proposed mechanisms and an API, messaging middleware systems can, in the process, be advantageously expanded such that they specify and provide end-to-end latencies at application level that cover the entire processing chain. In more general terms, time and latency information can be specified and provided at application level from the time of the generation of the communication content up to the final use of the communication content in the target processing operation. In this case, a plurality of hops may also be provided between the generation and the final use in the interim processing operations, i.e., calculations each having one communication therebetween.

In particular, an 'application level' can be construed as a functional level that comprises a communication of the at least one application (to at least one further application) in which inter-application information is taken into account. For example, 'at application level' can also mean that, in the process, a communication is carried out in one application layer as per the OSI model and/or by functions of the application(s).

Optionally, it may be possible for the system to be in the form of a cyber-physical system in which the chained processing operation forms a functional chain, in particular a cause-effect chain. This function chain may be provided by a plurality of communication connections between the processing blocks. In the process, the provided time information can be used to ascertain a processing period, in particular an end-to-end latency, of the entire chain. Advantageously, the distributed system may have a plurality of computing and communication resources. It may be provided that the applications are executed as distributed applications of the system having end-to-end time requirements, for example a maximum response time or a maximum data age. The method according to the present invention can have the advantage whereby said end-to-end time requirements at application level can be handled better across the computing and communication resources and across the entire function chain.

Furthermore, it is possible that the generation of the communication content comprises at least the following step:

capturing, by a sensor, the surroundings, in particular the surroundings of a device such as a vehicle, in order to provide the captured surroundings as the generated communication content.

It is also possible for the at least one interim processing operation and the target processing operation to comprise at least the following steps:

detecting at least one object in the captured surroundings of the device or vehicle on the basis of the generated communication content, in particular by way of a first interim processing operation, calculating a path on which to move the device or vehicle, in particular in the surroundings, on the basis of the at least one detected object, in order to provide the calculated path as the processed communication content, in particular by way of a second interim processing operation, activating an actuator in order to move the device or vehicle along the calculated path.

In the process, the actuator can be activated on the basis of the assessment of the processed communication content. The actuator can, for example, be a controller of the vehicle for moving and steering the vehicle at least partially autonomously. The proposed method, and in particular the mechanisms provided thereby and/or the API, have the advantage whereby the age and response times of communication content or topics can be taken into account. As a result, the functionalities can be time-conscious and latency-conscious, thereby allowing for more robust performance, for example using networked monitoring methods. In addition, this makes it simpler to fuse signals delivered by a plurality of different sensors (sensor fusion can thus be provided). Alternatively or additionally to the application for at least partially autonomous driving, it is possible for the method according to the present invention to be used in other automated driving applications and/or in a distributed piece of middleware and/or a robot system and/or in an industrial automation.

The present invention likewise relates to a computer program, preferably a computer program product, comprising commands which, when the computer program is executed by a computer, cause said computer to carry out the method according to the present invention. Therefore, the computer program according to the present invention brings the same advantages as disclosed in detail with reference to a method according to the present invention.

By way of example, a data processing device that executes the computer program may be provided as the computer. The computer may have at least one processor for executing the computer program. A non-volatile data memory may also be provided, in which the computer program is stored and from which the computer program can be read out by the processor for execution. The computer may, for example, be a computing node of the system.

The present invention may likewise relate to a computer-readable storage medium that comprises the computer program according to the present invention. By way of example, the storage medium is in the form of a data memory such as a hard disk and/or a non-volatile memory and/or a memory card. The storage medium may be integrated in the computer, for example.

In addition, the method according to the present invention may be embodied as a computer-implemented method.

The present invention likewise relates to a distributed system configured to carry out the method according to the present invention. Therefore, the distributed system according to the present invention brings the same advantages as described in detail with reference to a method according to the present invention.

Further advantages, features, and details of the present invention become apparent from the following description, in which exemplary embodiments of the present invention are described in detail with reference to the drawings. In this respect, the features disclosed herein may each be essential to the present invention individually per se or in any combination.

BRIEF DESCRIPTION OF THE DRAWING

In the subsequent figures, the same reference numerals are used for the same technical features even of different exemplary embodiments.

DETAILED DESCRIPTION OF EXAMPLE EMBODIMENTS

Figure 1:
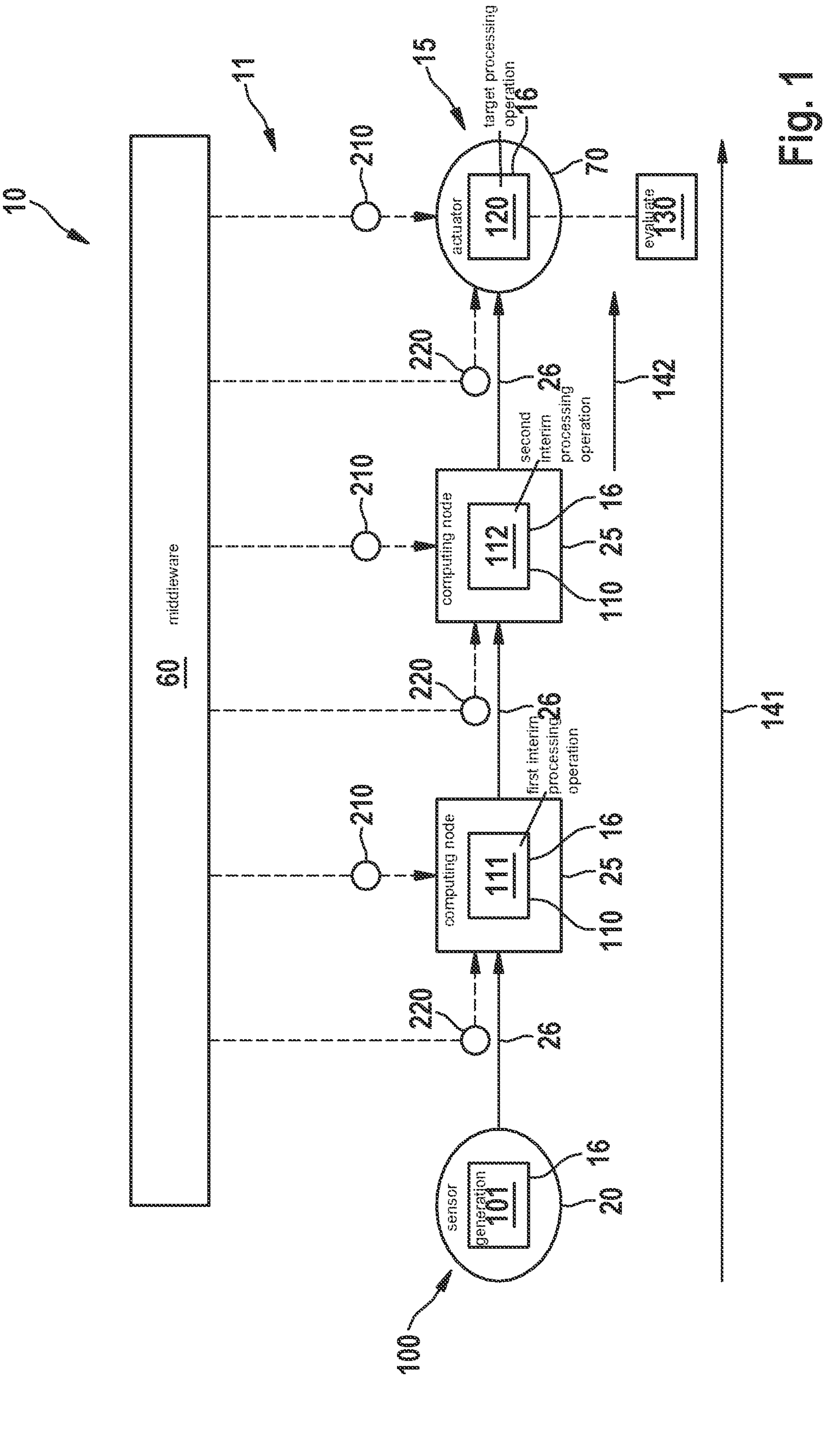
FIG. 1 is a schematic visualization of a method and system according to an example embodiment of the present invention.

FIG. 1 shows, by way of example, a function chain in a distributed system 10 of at least one application 15, which may also be construed as a cause-effect chain. Using the function chain, chained processing 100 of a piece of communication content 220 can be carried out. In this case, the chained processing operation 100 can be used to process the communication content 220 after the cause has occurred, i.e., after the communication content 220 has been generated 101, in a plurality of interim processing operations 110, so as to obtain an effect in a final processing step during the target processing operation 120. The cause is, for example, the generation 101 of the communication content 220 by a sensor 20, and the effect is the activation of an actuator 70.

According to the method of the present invention, and in particular using a piece of middleware 60, the communication content 220 can additionally be provided for the purpose of the chained processing 100 of the communication content 220. In this case, the interim processing operations 110 and the target processing operation 120 can be provided as parts of the chained processing operation 100 by different processing blocks 16 of the at least one application 15. The different processing blocks 16 can each be executed as different processes of the at least one application 15 or as different parts of the at least one application 15 or entirely as discrete applications 15 and preferably by different, heterogeneous computing nodes 105 of a network 11.

Conventional middleware solutions would limit the options for ascertaining a complete end-to-end latency of the function chain. As a result, it would not be possible to draw conclusions on the age of the data in the communication content 220 when activating the actuator 70. It may be that a conclusion can only be drawn on a data age for a small part of the cause-effect chain, for example the latency 142 of the last part upstream of the target processing operation 120. Therefore, in accordance with a method according to the present invention, an improvement is provided in that an item of time information 210 about a time of the generation 101 of the communication content 220 is provided. In the process, the time information 210 is provided for at least one of the different processing blocks 16 in order to evaluate 130 the time information 210 at least during the target processing operation 120 for the purpose of assessing the processed communication content 220. This allows the end-to-end latency 141 of the entire function chain to be evaluated, and thus allows for higher security during the target processing operation 120.

Figure 2:
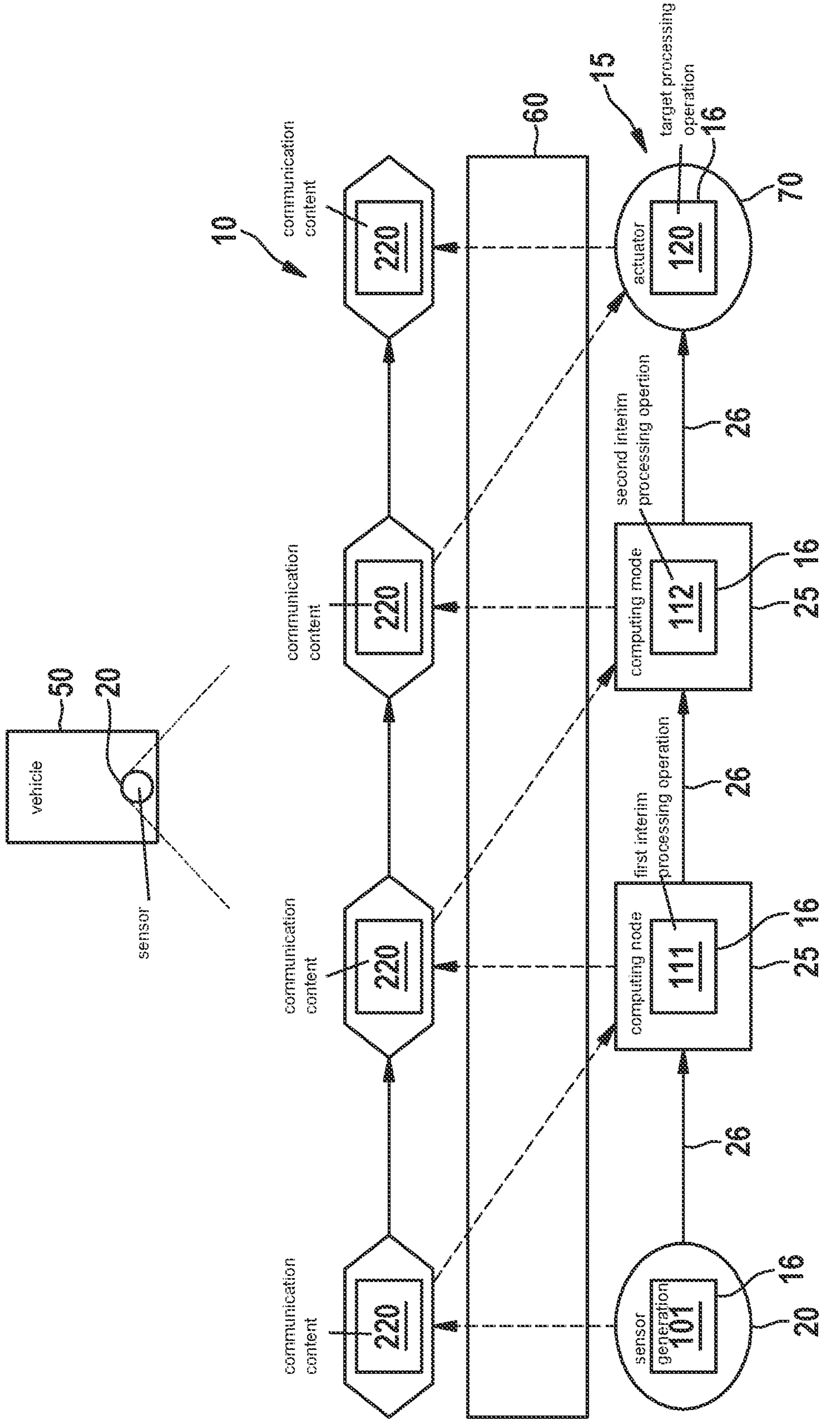
FIG. 2 is a further schematic visualization of a method and system according to an example embodiment of the present invention.
Figure 3:
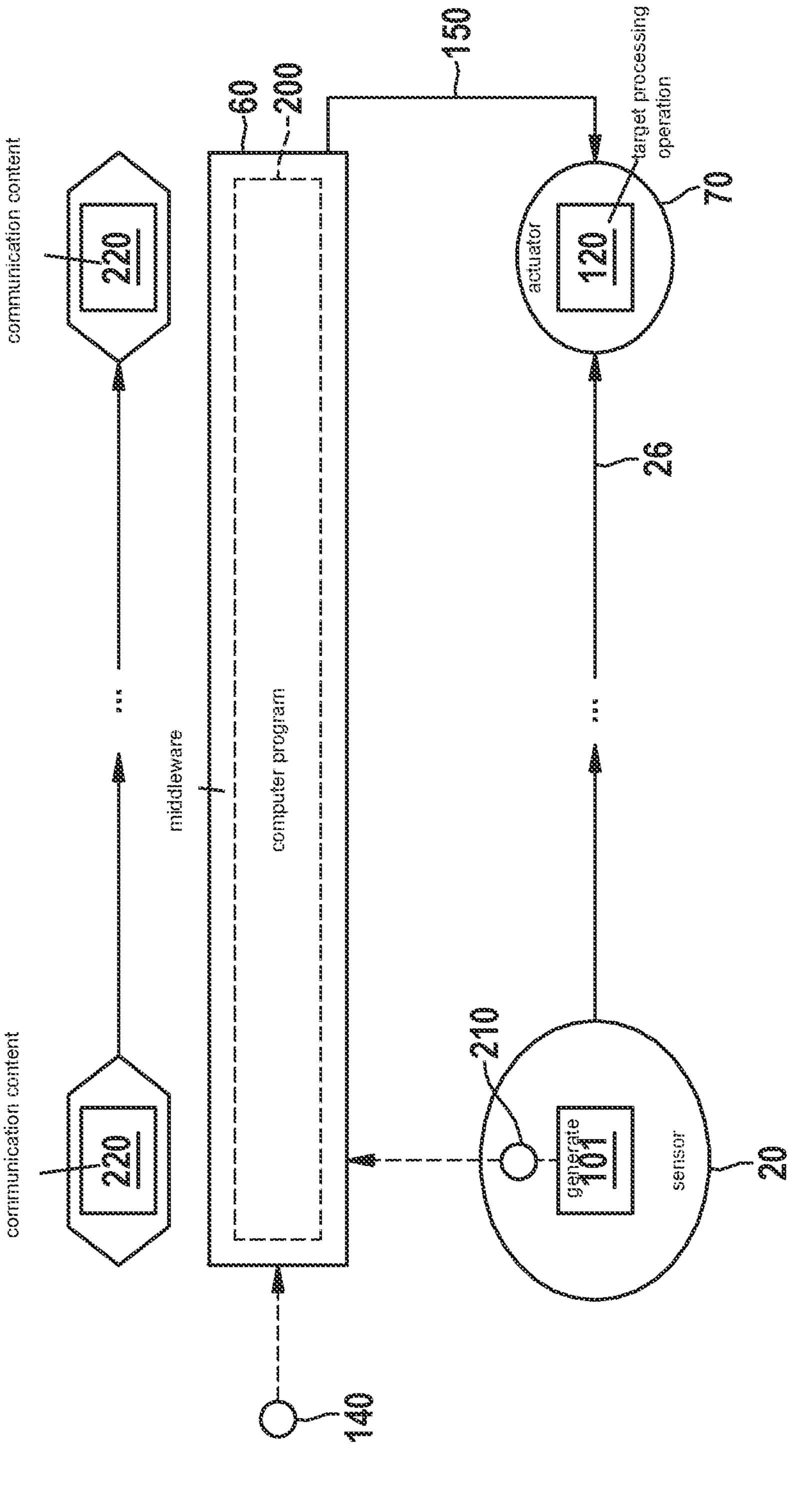
FIG. 3 is a schematic visualization of a method and system according to the present invention as well as a computer program.

FIGS. 1 to 3 also schematically show that both the communication content 220 and the time information 210, assigned thereto, can be provided by a piece of middleware 60. The middleware 60 can additionally provide communication 26 between the processing blocks 16 in order to provide the time information 210 and the communication content 220 during the chained processing operation 100. It can be provided that the time information 210 includes an item of latency information 141 about the time of the generation 101 up to a target processing operation 120 of the processed communication content 220. During the target processing operation 120, the assigned time information 210 can be retrieved using the middleware 60 for the purpose of the evaluation 130, optionally in order to evaluate a response time of the application 15 during the assessment.

The time information 210 can be assigned to the communication content 220 by, for example, the following mechanism, in which the communication content 220 is referred to as a topic:

data_produced (topic_name, topic_instance):

As a result, a mechanism can be provided by which the middleware 60 assigns the current time (e.g., with the aid of a time stamp), which corresponds, for example, to the time of the generation 101, to the particular instance of a topic ("topic_instance") having the indicated name ("topic_name").

Another option is to perform said assignment by specifying an additional manual time value:

data_produced (topic_name, topic_instance, elapsed_time in ms):

In this mechanism, a time value can be manually set as the production time in addition to the above-mentioned mechanism, using the parameter "elapsed_time in ms". This may be beneficial for taking account of lags of physical components (e.g., sampling and actuation lags) that cannot be directly taken into account at software level. In addition, this functionality can be used to track a cause-effect chain, including data transformations, through a distributed system, for example in cases in which received topics are used for calculations that lead to new topics which are then relayed through the system.

The provision of the time information 210, for example during the target processing operation 120, can be made possible, for example, using the following mechanism:

getTimeFromProduction (topic_name, topic_instance):

Using this mechanism, the middleware 60 can return a time at which the topic "topic_instance" was generated by "topic_name".

FIG. 3 shows that the middleware 60 can be configured to register a real-time requirement 140 in order to detect a breach of the real-time requirement 140 on the basis of the time information 210. Specifically, the real-time requirement 140 can define a maximum duration of an end-to-end latency 141 of the application 15 as illustrated in FIG. 1. The assessment of the processed communication content 220 can include comparing the time of the generation 101 with a current time and with the real-time requirement 140 in order to detect the breach of the real-time requirement 140. This comparison can be carried out, for example, during the target processing operation 120.

By way of example, the following mechanisms may also be provided for registering the real-time requirement 140:

setMaxAge (topic_name, max_age in ms):

This can provide a mechanism for the middleware 60 that is used to give all the received topics (i.e., "topic_instances" of the type "topic_name") an age restriction (for example indicated in milliseconds). By way of example, the topics can then be rejected or blocked automatically once the age restriction has been exceeded.

In addition, the middleware 60 may optionally not relay to processing blocks any communication content 220 that has already breached an age restriction, so as to thus reduce the data traffic in the network. Other options may also be provided. For example, a functional reaction may take place, i.e., the data can be processed in a different or adapted way.

setMaxReactionTime (topic_name max_reaction in ms):

In this case, in addition to the aforementioned mechanism, the indicated time "max_reaction" of a maximum required response time can be indicated, for example in milliseconds.

In addition, it may be possible according to FIG. 3 for the middleware 60 to be configured to register a callback 150 in order to execute the callback 150 as soon as the breach of the real-time requirement 140 is detected. In the specific example, the system 10 can be in the form of a cyber-physical system in which an actuator 70 is activated depending on the target processing operation 120, wherein the callback 150 is executed so as to stop the activation of the actuator 70, which should also be construed as meaning that the reaction is adjusted. By way of example, this makes use possible in autonomous driving or for path calculation in at least partially autonomous driving. By way of example, to generate 101 the communication content 220, the surroundings of a vehicle 50 can be captured by a sensor 20 in order to provide the captured surroundings as the generated communication content 220. The chained processing operation can then include detecting at least one object in the captured surroundings of the vehicle 50 shown in FIG. 2 on the basis of the generated communication content 220. Next, a path on which to move the vehicle 50 can be calculated on the basis of the at least one detected object, in order to provide the calculated path as the processed communication content 220. Both the detection and the calculation can be carried out by distinct interim processing operations 110. Next, in the target processing operation 120, an actuator 70 can be activated in order to move the vehicle 50 along the calculated path. However, the actuator can be activated on the basis of the assessment of the processed communication content 220. In the example given, the activation can be stopped if it is noted on the basis of the assessment that the planned path is based on outdated data. The advantage of this is that undesirable situations can be avoided, for example if the path followed is based on objects that were detected too long ago, since the actual situation may have changed entirely in the meantime (as regards the position of the objects, new objects, etc.).

A callback can be registered, for example, using the following mechanism:

registerExceptionCallback (callback_method, topic_name):

This mechanism of the middleware 60 allows callbacks to be registered, which are automatically retrieved by the middleware 60 if an instance of the topic of the type "topic_name" that breaches the stated time requirements is received at the computing node that registered the callback.

According to FIG. 2, the at least one interim processing operation 110 can comprise a first and a second interim processing operation 111, 112 and optionally further interim processing operations 110. The communication content 220 can be provided by initially providing the generated communication content 220 for the chained processing operation 100 for the interim processing operations 111, 112 by way of the communication 26, and by providing a result 220 of the interim processing operations 111, 112 for the target processing operation 120, wherein the communication 26 can be provided by the middleware 60, in particular messaging middleware, between the processing blocks 16 at application level. The time information 210 can also be provided at said application level.

FIG. 3 likewise visualizes a computer program 200 that can be executed by a computing node 25 in order to provide the steps of a method according to the present invention.

The aforementioned explanation of the specific embodiments describes the present invention solely within the framework of examples. It goes without saying that, where technically feasible, individual features of the specific embodiments can be freely combined with one another without departing from the scope of the present invention.

What is claimed is:

1. A method for providing an item of time information related to a piece of communication content in a distributed system of at least one application, the method comprising:

providing the time information about a time of a generation of the communication content;

providing the communication content for a chained processing of the communication content, the chained processing including at least one interim processing operation and a target processing operation, which are executed by different processing blocks of the at least one application, wherein the at least one interim processing operation is upstream of the target processing operation;

wherein the time information is provided for at least one of the different processing blocks to evaluate the time information at least during the target processing operation for assessing the processed communication content to determine a data age of the communication content based on the time of a generation, wherein the system is a cyber-physical system in which the chained processing operation forms a functional cause-effect chain, provided by a plurality of communication connections between the processing blocks, wherein the provided time information is used to ascertain a processing period including an end-to-end latency of the entire chain.

2. The method as recited in claim 1, the providing steps are performed by a piece of middleware that provides communication between the processing blocks to provide the time information during the chained processing operation in a manner assigned to the communication content.

3. The method as recited in claim 1, wherein the time information is provided by assigning the time information to the communication content, wherein the time information includes an item of latency information about the time of the generation, up to a target processing of the processed communication content, wherein the assigned time information is retrieved during the target processing operation for the evaluation to evaluate a response time of the application and/or a data age of the communication content during the assessment.

4. The method as recited in claim 1, wherein the providing steps are performed by a piece of middleware that is configured to register a real-time requirement to detect a breach of the real-time requirement based on the time information, wherein the real-time requirement defines a maximum duration of a latency of the application.

5. The method as recited in claim 4, wherein the assessment of the processed communication content includes:

comparing the time of the generation with a current time and with the real-time requirement to detect the breach of the real-time requirement.

6. The method as recited in claim 1, wherein the time information is provided for a plurality or all of the different processing blocks to evaluate the time information during the at least one interim processing operation and during the target processing operation for assessing the processed communication content.

7. The method as recited in claim 1, wherein the at least one application and/or the processing blocks are each allocated a real-time requirement or different real-time requirements, wherein the real-time requirement or the different real-time requirements include at least one of the following requirements:

a maximum execution time of the application and/or of the at least one interim processing operation and/or of the target processing operation;

a maximum response time of the application;

a maximum data age of the processed communication content, wherein the data age is derived from the time information about the time of the generation of the communication content and a current time during the chained processing operation;

wherein the provided time information is evaluated at least during the target processing operation to assess compliance with the at least one requirement.

8. The method as recited in claim 1, wherein the different processing blocks are each executed as different processes of the at least one application or as different parts of the at least one application and by different, heterogeneous computing nodes of a network.

9. The method as recited in claim 1, wherein a plurality of interim processing operations are provided as the at least one interim processing operation, wherein the communication content is provided by initially providing the generated communication content for the chained processing operation for the interim processing operations by way of a communication, and by providing a result of the interim processing operations as the processed communication content for the target processing operation, wherein the communication is provided by a piece of messaging middleware, between the processing blocks at an application level, wherein the time information is provided at the application level.

10. A method for providing an item of time information related to a piece of communication content in a distributed system of at least one application, the method comprising:

providing the time information about a time of a generation of the communication content;

providing the communication content for a chained processing of the communication content, the chained processing including at least one interim processing operation and a target processing operation, which are executed by different processing blocks of the at least one application, wherein the at least one interim processing operation is upstream of the target processing operation;

wherein the time information is provided for at least one of the different processing blocks to evaluate the time information at least during the target processing operation for assessing the processed communication content to determine a data age of the communication content based on the time of a generation, wherein the providing steps are performed by a piece of middleware that is configured to register a real-time requirement to detect a breach of the real-time requirement based on the time information, wherein the real-time requirement defines a maximum duration of a latency of the application, wherein the assessment of the processed communication content includes: comparing the time of the generation with a current time and with the real-time requirement to detect the breach of the real-time requirement, wherein the middleware is configured to register a callback to execute the callback as soon as the breach of the real-time requirement is detected.

11. The method as recited in claim 10, wherein the system is a cyber-physical system in which an actuator is activated depending on the target processing operation, wherein the callback is executed so as to stop the activation of the actuator and/or to change the activation to run the actuator in a slowed-down manner.

12. A method for providing an item of time information related to a piece of communication content in a distributed system of at least one application, the method comprising:

providing the time information about a time of a generation of the communication content;

providing the communication content for a chained processing of the communication content, the chained processing including at least one interim processing operation and a target processing operation, which are executed by different processing blocks of the at least one application, wherein the at least one interim processing operation is upstream of the target processing operation;

wherein the time information is provided for at least one of the different processing blocks to evaluate the time information at least during the target processing operation for assessing the processed communication content to determine a data age of the communication content based on the time of a generation, where the generation of the communication content includes at least the following step:

capturing, by a sensor, surroundings of a vehicle to provide the captured surroundings as the generated communication content, and wherein the at least one interim processing operation and the target processing operation include at least the following steps:

detecting at least one object in the captured surroundings of the vehicle based on the generated communication content, calculating a path on which to move the vehicle based on the at least one detected object to provide the calculated path as the processed communication content, activating an actuator to move the vehicle along the calculated path, wherein the actuator is activated based on the assessment of the processed communication content.

13. A non-transitory computer-readable medium on which is stored a computer program including commands for providing an item of time information related to a piece of communication content in a distributed system of at least one application, the computer program, when executed by a computer, causing the computer to:

provide the time information about a time of a generation of the communication content;

provide the communication content for a chained processing of the communication content, the chained processing including at least one interim processing operation and a target processing operation, which are executed by different processing blocks of the at least one application, wherein the at least one interim processing operation is upstream of the target processing operation;

wherein the time information is provided for at least one of the different processing blocks to evaluate the time information at least during the target processing operation for assessing the processed communication content to determine a data age of the communication content based on the time of a generation, wherein the system is a cyber-physical system in which the chained processing operation forms a functional cause-effect chain, provided by a plurality of communication connections between the processing blocks, wherein the provided time information is used to ascertain a processing period including an end-to-end latency of the entire chain.

14. A distributed system configured to provide an item of time information related to a piece of communication content in the distributed system of at least one application, the distributed system configured to:

provide the time information about a time of a generation of the communication content;

provide the communication content for a chained processing of the communication content, the chained processing including at least one interim processing operation and a target processing operation, which are executed by different processing blocks of the at least one application, wherein the at least one interim processing operation is upstream of the target processing operation;

wherein the time information is provided for at least one of the different processing blocks to evaluate the time information at least during the target processing operation for assessing the processed communication content to determine a data age of the communication content based on the time of a generation, wherein the system is a cyber-physical system in which the chained processing operation forms a functional cause-effect chain, provided by a plurality of communication connections between the processing blocks, wherein the provided time information is used to ascertain a processing period including an end-to-end latency of the entire chain.

* * * * *